(12) United States Patent
Marks et al.

(10) Patent No.: US 10,891,489 B2
(45) Date of Patent: Jan. 12, 2021

(54) IDENTIFYING AND TRACKING WORDS IN A VIDEO RECORDING OF CAPTIONING SESSION

(71) Applicant: Nedelco, Incorporated, Aurora, NE (US)

(72) Inventors: Seth Merrill Marks, Benson, AZ (US); Jeffery F. Knighton, Vail, AZ (US); Charles Scott Toller, Bountiful, UT (US)

(73) Assignee: NEDELCO, INCORPORATED, Aurora, NE (US)

( * ) Notice: Subject to any disclaimer, the term of this patent is extended or adjusted under 35 U.S.C. 154(b) by 0 days.

(21) Appl. No.: 16/378,503

(22) Filed: Apr. 8, 2019

(65) Prior Publication Data

US 2020/0320308 A1 Oct. 8, 2020

(51) Int. Cl.
*G06K 9/00* (2006.01)
*H04N 21/488* (2011.01)
*H04N 21/43* (2011.01)
*G06F 16/48* (2019.01)
*G06F 16/432* (2019.01)
*G06K 9/34* (2006.01)

(52) U.S. Cl.
CPC ....... *G06K 9/00744* (2013.01); *G06F 16/433* (2019.01); *G06F 16/489* (2019.01); *G06K 9/344* (2013.01); *H04N 21/4307* (2013.01); *H04N 21/4888* (2013.01)

(58) Field of Classification Search
CPC ......... H04N 21/4888; H04N 21/44008; H04N 21/4307; G06F 16/43; G06F 16/489; G06F 16/433; G06K 9/00744; G06K 9/344; G10L 15/04; G10L 15/08
USPC .................. 348/468; 382/159; 386/201, 241; 705/14.23; 715/716; 725/53; 704/260, 704/10
See application file for complete search history.

(56) References Cited

U.S. PATENT DOCUMENTS

| | | | | |
|---|---|---|---|---|
| 7,139,031 | B1* | 11/2006 | Bray | H04N 5/23241 348/468 |
| 2007/0091167 | A1* | 4/2007 | Shiina | G06F 1/1626 348/14.01 |
| 2007/0185704 | A1* | 8/2007 | Yoshimura | G10L 17/26 704/10 |
| 2008/0219641 | A1* | 9/2008 | Sandrew | H04N 21/4307 386/201 |
| 2009/0259473 | A1* | 10/2009 | Chang | G10L 13/00 704/260 |
| 2012/0304062 | A1* | 11/2012 | Schultz | H04N 21/440236 715/716 |

(Continued)

*Primary Examiner* — Thai Q Tran
*Assistant Examiner* — Stephen R Smith
(74) *Attorney, Agent, or Firm* — Foley & Lardner LLP (57) ABSTRACT

Disclosed are a method, a system, and a non-transitory computer readable medium for identifying captions in captioned video. A method includes receiving audio and video content from a caption device where the video content includes captioned text, extracting frames of video from the received video content where the frames of video include captioned text, recognizing text from the captioned text in the extracted frames of video, and generating a descriptive textual file including timing information for the recognized text and timing information for the captioned text.

20 Claims, 5 Drawing Sheets

(56) References Cited

U.S. PATENT DOCUMENTS

| | | | |
|---|---|---|---|
| 2012/0315011 A1* | 12/2012 | Messmer | H04N 21/8358 386/230 |
| 2013/0124984 A1* | 5/2013 | Kuspa | H04N 21/4307 715/255 |
| 2013/0159081 A1* | 6/2013 | Shastry | G06Q 30/0274 705/14.23 |
| 2013/0302010 A1* | 11/2013 | Kuo | H04N 9/44 386/241 |
| 2014/0053068 A1* | 2/2014 | Devi | G06F 40/169 715/256 |
| 2015/0128190 A1* | 5/2015 | Wang | G06F 16/735 725/53 |
| 2016/0293160 A1* | 10/2016 | Nir | G06F 16/7844 |
| 2017/0228599 A1* | 8/2017 | De Juan | G06K 9/00697 |

\* cited by examiner

FIG. 5

IDENTIFYING AND TRACKING WORDS IN A VIDEO RECORDING OF CAPTIONING SESSION

BACKGROUND

The following description is provided to assist the understanding of the reader. None of the information provided is admitted as prior art.

Captions allow people to view audio, including spoken words in a text form. Captions may be presented on a display in blocks of words, where each block includes one or more words. For example, two or more words in a first block are simultaneously presented, and subsequently additional words in a second block are simultaneously presented. Each block may be presented at a corresponding time of the dialogue, such that the viewer of the captions can follow the dialogue without hearing the sound. However, there are a number of challenges to the production and the display of captions that affect the usability of the captions from the perspective of the viewer. First, the captions may not accurately match the words spoken in the audio. Second, the captions may not be displayed with an appropriate level of synchronicity with the corresponding audio. Additionally, there are other considerations that can affect the utility of captions for a particular viewer, including but not limited to font size and selection, punctuation, and the pacing of captions.

In a number of service environments, including broadcast television and telecommunications, the availability of captions for audio serves an important accessibility function, enabling these services to be usable in a functionally equivalent way for people who are Hard of Hearing, Deaf, or Deaf-Blind. Especially for federally regulated captioning services, it is desirable to ensure that service providers are able to deliver captions that meet certain thresholds of quality, based on various measurement criteria.

For the purposes of measuring captioning quality of various captioning systems, it is a common practice to utilize video and audio recording equipment to capture the caption display and audio experience from the user's perspective at the time that the service is being used. The captions are thus embedded within the captured video feed, not as a separate data feed. Additionally, the captured video file captures the audio. The captured video file becomes a valuable portable and permanent record of the experience and enables the measurement of quality metrics to be performed subsequent and asynchronous to the original captioning session.

Techniques for measuring caption quality metrics based on a video file are typically labor intensive, and prone to human bias, errors and inconsistencies. In typical environments, humans will visually review some or all of the audio and video feeds, manually noting what captions are displayed and when the corresponding audio is heard in order to gather measurements for quality assessments.

The embodiments described herein provide a novel approach whereby video may be processed by a computing environment in a way that creates an descriptive textual file as output that includes information about the captions, including what captions were displayed, when they were displayed on the screen as well as when they were displayed relative to the corresponding spoken words within the audio feed. This textual file can then serve as input to either human-based or computer-based systems that gather measurements for quality assessment. The use of this invention has the potential benefits to eliminate human bias and errors, and potentially reduce the labor and time involved in the assessment process. In a separate use case, the descriptive textual file may be used to optimally realign the timing of captions with spoken audio for future broadcasts of the original video/audio content.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments disclosed herein are related to a method, a system, a device, and a non-transitory computer readable medium for identifying and tracking words in a video recording of a captioning system. For example, a non-transitory computer readable medium having instructions when executed by a processor cause the processor to receive audio and video content from a caption device where the video content includes captioned text; extract frames of video from the received video content where the frames of video include captioned text; recognize text from the captioned text in the extracted frames of video; and generate a descriptive textual file including the recognized text aligned with captioned text. The descriptive textual file can be used to realign the timing of captions with spoken audio for future broadcasts of the original video/audio content in an optimal format.

At least one embodiment uses several operations to accomplish the goal of tracking the captions recorded during a live telephone call. The basic overview of the at least one embodiment is as follows. Additional embodiments could include processing live video feeds. First, the system receives a video file, containing a recording of both a screen of a captioning device and audio emanating from the speaker of the telephone or audio communication device. The system then extracts image frames of the video up to a given time resolution needed for the project. Each frame of video is run through an optical character recognition (or OCR) tool. From the output of the OCR tool, the captioned text from each frame is then stitched together using a diffing and backtrack algorithm. Finally, the output of this diffing stage is passed to an audio alignment tool, that takes the captions captured in the video and aligns them to when they are heard in the aforementioned audio stream.

More particularly, according to an exemplary embodiment, the initial video stream can be pre-processed to improve the image characteristics that are critical to text recognition. These characteristics include high contrast and removal of non-textual artifacts. Additionally, modifications and scaling for performance can also be considered. The output of this stage is a series of processed and filtered images that can be fed into an optical character recognition (OCR) operation to identify text within each video frame.

In the OCR operation, each image is processed by an OCR tool that identifies words in the image. In an example embodiment, to speed the process, the images are split into batches. This allows the OCR software tool to run in parallel and greatly reduce the time spent. The OCR software tool identifies a block of text. Once text is identified certain formatting characters not critical to the overall algorithm can be removed. Once a final text block is defined it can be sent to the next step, diffing.

The diffing operation, once initialized, processes the text output from each frame processed by the previous OCR step. The diffing phase begins by filtering the text and removing all but the essential words identified within. These words can then be filtered against a language dictionary to further optimize the text for frame by frame comparison operations. Once the preparatory processing is complete words from each frame are compared. The output of the comparison identifies which words were added, removed and modified within the video frames. Additionally, the diffing operation identifies timing associated with the insertion, deletion and modification of each word. Additionally, the algorithm identifies whether words were removed from the screen due to a scrolling event or whether they were replaced by corrected words. The difference description can be analyzed to identify events such as line scrolling which is common to video rendering of captioned text.

When each frame has been processed, the system now has a completed word list that encapsulates each caption and how it changed over the course of the session, along with the video timing data. This word data is then sent to the audio alignment step.

The word list at this point is temporarily reduced to a text transcript. The transcript is sent, along with the audio from the video, to an audio alignment algorithm. This algorithm uses the transcript that is output from the diffing phase and analyzes the audio to determine exactly when those words were spoken in the audio. This timing data is then added to the existing metadata created in the previous steps. This audio timing metadata allows for a variety of analyses to be performed, such as delay between a word being spoken and when it is then captioned on the display. The alignment algorithm additionally identifies words that were identified within the audio but not contained within the transcript as well as words contained in the transcript that were not detected within the audio. This information is useful in the scoring stage.

Figure 1:
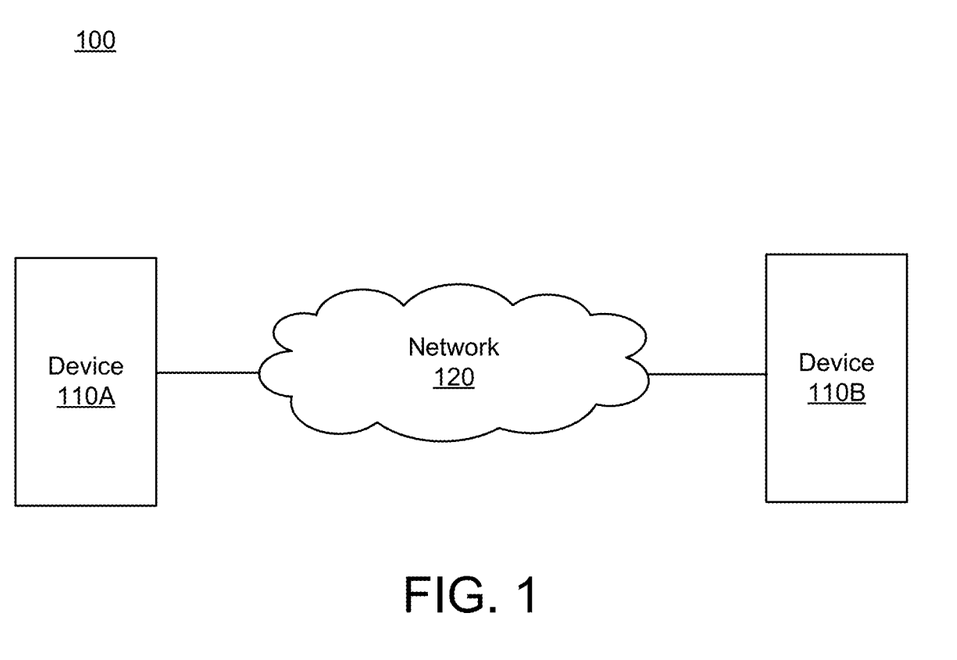
FIG. 1 is a block diagram of a computing environment including devices capable of displaying captioned video according to an example embodiment.

The final transcript is published in a descriptive textual format, and includes the word appearing on the display, the time it appeared on this display, when that word was spoken in the audio (or a marker if the word did not match what was said in the audio), and a history of how the caption changed over time due to corrections of the captioner. This data is then ready to be analyzed for overall transcript accuracy FIG. 1 illustrates a computing environment 100 according to an example embodiment. In some embodiments, the computing environment 100 includes devices 110A, 110B and a network 120. The devices 110A and 110B can be any computing devices communicating over the network 120. Examples of computing devices include a phone with a display screen, a smartphone, a desktop, a tablet PC, server computer, etc.

The network 120 is a hardware component, through which the devices 110 can communicate. The network 120 is implemented as a wired network, a wireless network, or a combination of them. Examples of the wired network include a network based on Ethernet, USB, RS232, etc. Examples of the wireless network include a cellular network, a satellite network, 1G, 2G, 3G, 4G, 60 GHz communication network, WiFi, Bluetooth, near field communication, etc.

In one example configuration, a live call session between the devices 110A and 110B can be established, and a caption indicating a dialogue of the live call is displayed on the device 110B. The device 110A may detect audio including a voice of a user operating the device 110A and generate an audio data electrically representing the audio. The device 110A may detect a dialogue from the audio data and generate a caption data electrically representing the dialogue in the audio. The device 110A may transmit the caption data to the device 110B through the network 120. In some embodiments, the device 110A forwards the audio data to the device 110B through the network 120, and the device 110B generates a caption data electrically representing the dialogue in the audio. Based on the caption data, the device 110B renders a visual representation of the caption.

Figure 2:
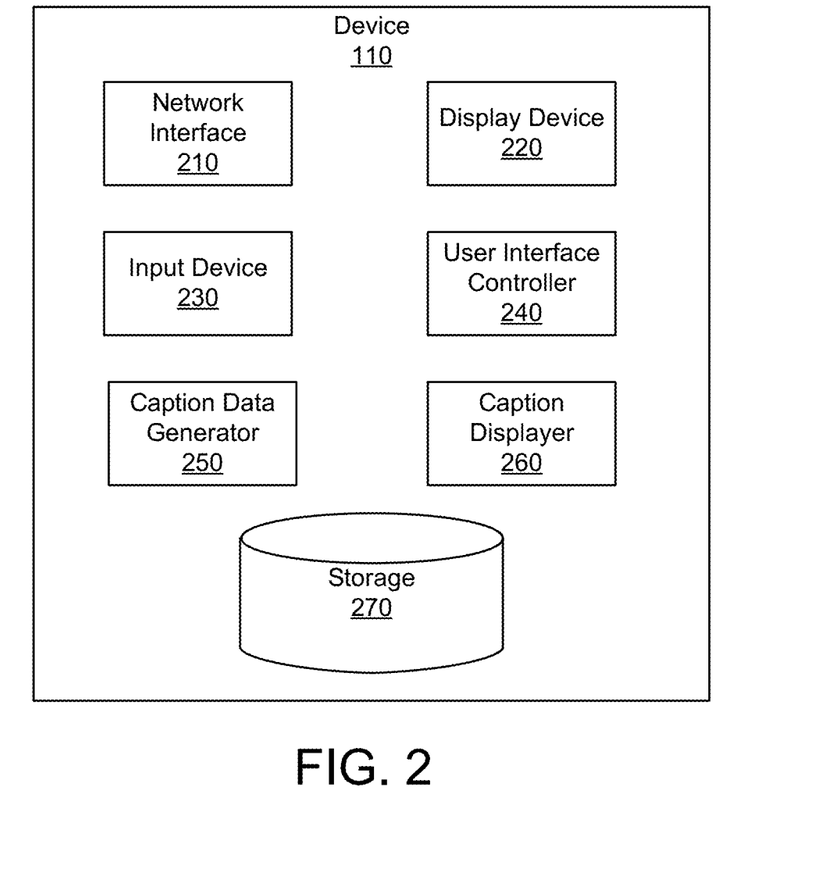
FIG. 2 is a block diagram of a device for presenting captioned video according to an example embodiment.

FIG. 2 illustrates a device 110 for presenting captions according to an example embodiment. In some embodiments, the device 110 includes a network interface 210, a display device 220, an input device 230, a user interface controller 240, a caption data generator 250, a caption displayer 260, and storage 270. These components may be embodied as hardware, software, or a combination thereof. These components operate together to present a user interface to present captions according to a caption rate. In other embodiments, the device 110 includes more, fewer, or different components than shown in FIG. 2.

The network interface 210 is a component coupled to the network 120. The network interface 210 communicates with a network interface 210 of another device. For example, the network interface 210 receives an audio data electrically representing an audio to be reproduced, a video data electrically representing a video to be reproduced or a combination of them through the network 120. For another example, the network interface 210 receives a caption data electrically representing the dialogue in a text form.

The display device 220 is a component that renders a visual representation. The display device 220 may display one or more images according to the video data. Examples of the display device 220 include plasma display panel (PDP), a liquid crystal display (LCD), an organic light emitting diode (OLED) display, a projector, or a cathode ray tube (CRT), or any combination of them.

The input device 230 is a component that receives a user input. Examples of the user input include executing an application, establishing a call session with another device, displaying one or more images, rendering an audio representation, displaying captions, adjusting a setting for displaying captions, etc. For example, a font color, a font size, or a caption rate of captions displayed may be adjusted according to the user input. The input device 230 may be implemented as a pointing device (e.g., a mouse), a keyboard, a keypad, a touch pad, etc. to receive the user input. In some embodiments, the input device 230 and the display device 220 are implemented as a touch display panel that displays images and senses a user touch or a user interaction associated with a user input.

The user interface controller 240 is a component that generates a user interface. In one aspect, the user interface controller 240 generates a user interface to allow a user to adjust a setting for displaying captions and presents the user interface through the display device 220. The user interface controller 240 may also receive the user input to adjust the setting for displaying captions through the input device 230. In one approach, the user interface controller 240 generates a slider control interface to allow easy control of the setting for displaying captions. In one implementation, the slider control interface includes a repositionable slider on a track, where a position of the slider on the track indicates a corresponding setting for displaying captions. For example, the device 110 is a smartphone employing a touch display device to receive a user input through a user touch. The user may easily reposition the slider along the track through a simple touch operation on the smartphone to change the setting for displaying captions.

The caption data generator 250 is a component that generates a caption data electrically representing captions to be displayed. In one approach, the caption data generator 250 receives an audio data electrically representing an audio and detects a human voice from the audio. Moreover, the caption data generator 250 detects a dialogue associated with the human voice and generates a caption data electrically representing captions of the dialogue. In one aspect, captions include multiple blocks of words, where each block of words is associated with a corresponding time of the dialogue. The caption data generator 250 may also generate block indicators each indicating a beginning of a corresponding block and an associated timing. For example, a block indicator is represented as a "^" character and is added at a beginning of a block in the caption data. The block indicators may not be displayed by the display device 220, but used by the device 110 (e.g., the caption displayer 260) to indicate timings to display beginnings of blocks of words.

The caption displayer 260 is a component that renders a visual representation of captions indicated by the caption data. The caption displayer 260 may obtain settings for displaying captions and cause the display device 220 to display captions. In one approach, the caption displayer 260 detects a block indicator from the caption data and causes a first character of a first word in the block to be displayed at a corresponding time indicated by the caption data. Moreover, the caption displayer 260 causes captions to be displayed by the display device 220 according to the caption rate specified by the setting for displaying captions. For example, the caption displayer 260 obtains a character hold time period from the caption data. The character hold time period indicates a time period after displaying a character in a block and before displaying a subsequent character in the block. The caption displayer 260 causes the display device 220 to display a character in a block to be presented the character hold time period after presenting a preceding character. By adjusting the character hold time, the caption rate of captions presented by the display device 220 can be adjusted.

The storage 270 is a component that stores data within the device 110. The storage 270 may be a non-transitory computer readable medium. The storage 270 may store instructions when executed by a processor (not shown) of the device 110 cause the processor to execute various functionalities disclosed herein. The storage 270 may store metadata, etc. In some embodiments, the storage 270 also stores audio data, video data, metadata, etc. The storage 270 may also store caption data including captions, block identifiers, and setting for displaying captions (e.g., font color, font size, a caption rate, character hold time period, etc.). The storage 270 allows components within the device 110 such as the network interface 210, display device 220, input device 230, user interface controller 240, caption data generator 250, caption displayer 260 to access stored data.

Figure 3:
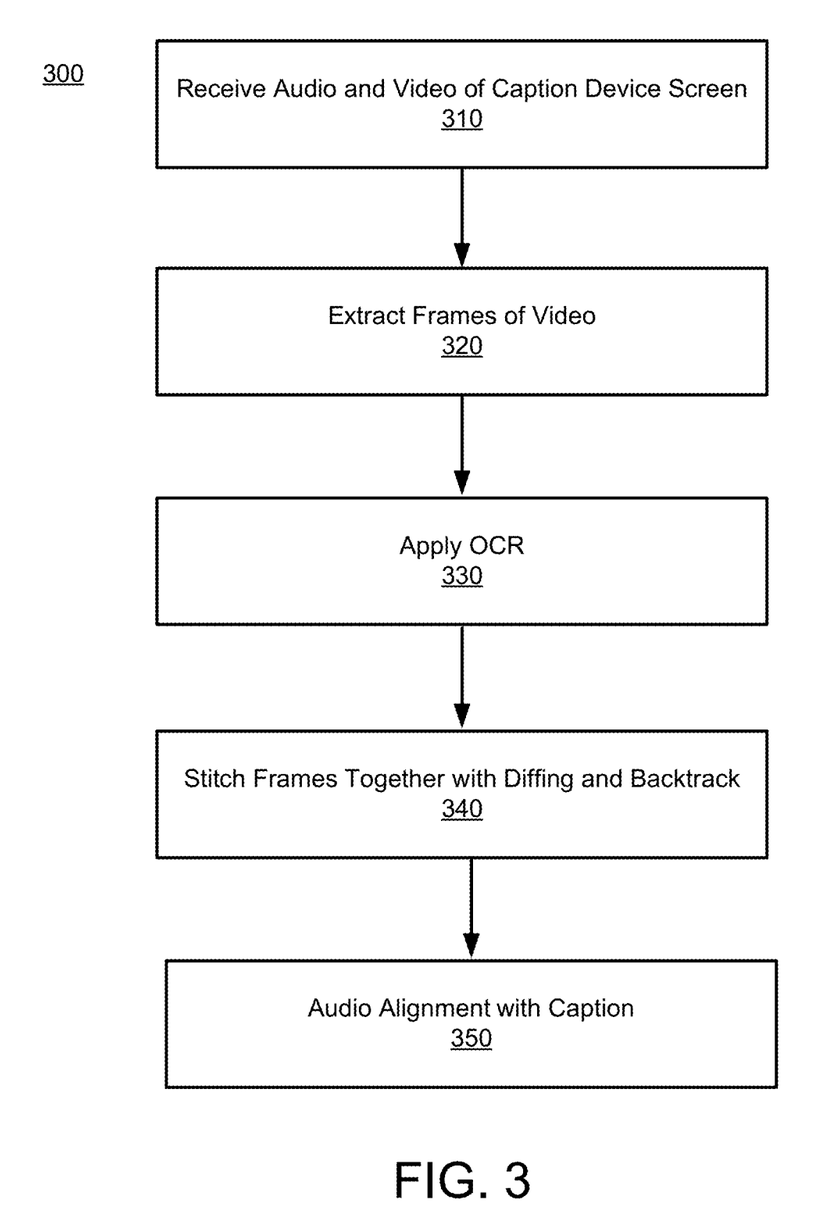
FIG. 3 is a flow chart illustrating a process of identifying caption text in a video according to an example embodiment.

FIG. 3 illustrates a flow chart showing a process 300 of tracking the captions recorded during a live telephone call according to an example embodiment. The process 300 may be performed by a system near the device 110. In other embodiments, the process 300 may be performed by other entities. In other embodiments, the process 300 includes more, fewer, or different steps than shown in FIG. 3.

In an operation 310, a device receives a video file containing a recording of both a screen of a captioning device and an audio emanating from the speaker of the telephone or audio communication device. The device can receive the video file via a local download or transfer or a communication from a remote location over a network. In an operation 320, the device takes image frames of the video at a given time resolution needed for the project. The frames are obtained by taking multiple segments, slices, or snapshots of video. The frequency of snapshots taken can be adjusted depending on the speed of captioning, the quality of captioning, or other such characteristics.

In an operation 330, each frame is then processed using an optical character recognition (or OCR) software tool to output recognized text. The process of text recognition proceeds according to a number of techniques described below, including techniques described with reference to FIG. 5. In an operation 340, the device stitches each processed frame together using a diffing and backtrack algorithm. The stitching of frames occurs in iterations. In an operation 350, the output of this diffing stage is passed to an audio alignment tool that takes the captions captured in the video and determines when the caption was displayed compared to when the audio was spoken. A sample file with the information is provided below.

```
[
    {
        "word": "This",
        "appearedInVideoAt": 7.9,
        "history": [
            {
                "word": "his",
                "appearedInVideoAt": 4.2
            },
            {
                "word": "This",
                "appearedInVideoAt": 0.6000000000000001
            }
        ],
        "spokenInAudioAt": 0.43
    },
```

-continued

```
{
    "word": "is",
    "appearedInVideoAt":
0.6000000000000001,
    "history": [ ],
    "spokenInAudioAt": 0.54
},
{
    "word": "a",
    "appearedInVideoAt":
0.6000000000000001,
    "history": [ ],
    "spokenInAudioAt": 0.65
},
{
    "word": "test",
    "appearedInVideoAt": 1.1,
    "history": [
        {
            "word": "task",
            "appearedInVideoAt": 0.9
        },
        {
            "word": "two",
            "appearedInVideoAt":
0.6000000000000001
        }
    ],
    "spokenInAudioAt": 1.41
}
]
```

Figure 4:
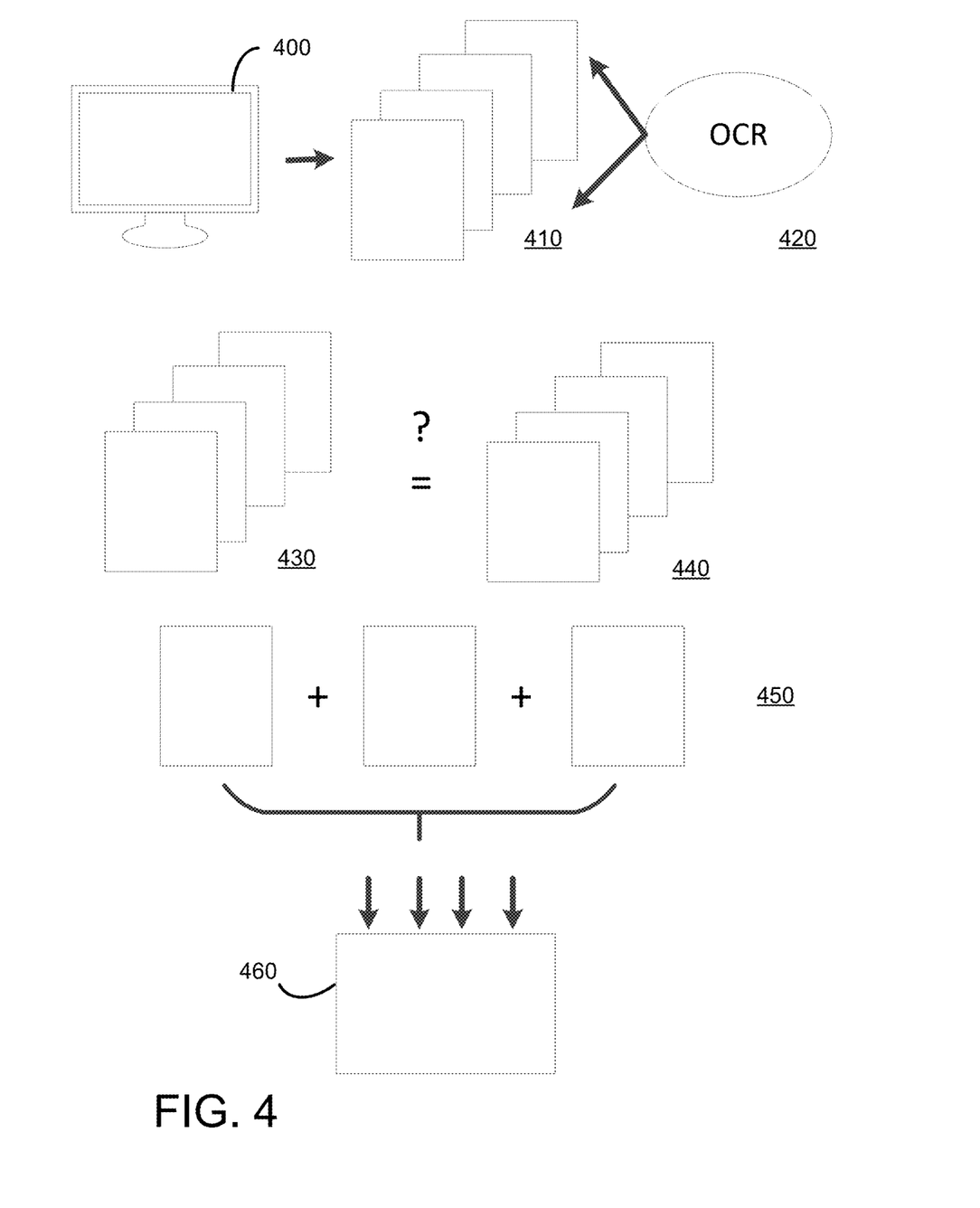
FIG. 4 is a diagram illustrating identifying caption text in a video according to an example embodiment

Referring to FIG. 4, illustrated is a diagrammatical representation of an illustrative embodiment in which captions appear on a display 400. A capture device records a stream of captions in a stream of audio and video. A processor extracts individual frames 410 from the captured video stream. The number of individual frames 410 depends on the length of the video and the frequency of slices or snapshots taken. An OCR program 420 is applied to the individual frames 410 to recognize the text shown on each frame 410. In some embodiments, OCR program 420 recognizes text in batches of individual frames 410.

Versions 430 and 440 of the processed individual frames 410 are compared to each other to identify differences in the frames. The processor iterates over versions of the frames until a level of confidence in the caption recognition process is met. The processor stitches the processed frames into a processed video 450, determines audio timing information and compares it with corresponding captions, and generates a descriptive textual file 460.

Figure 5:
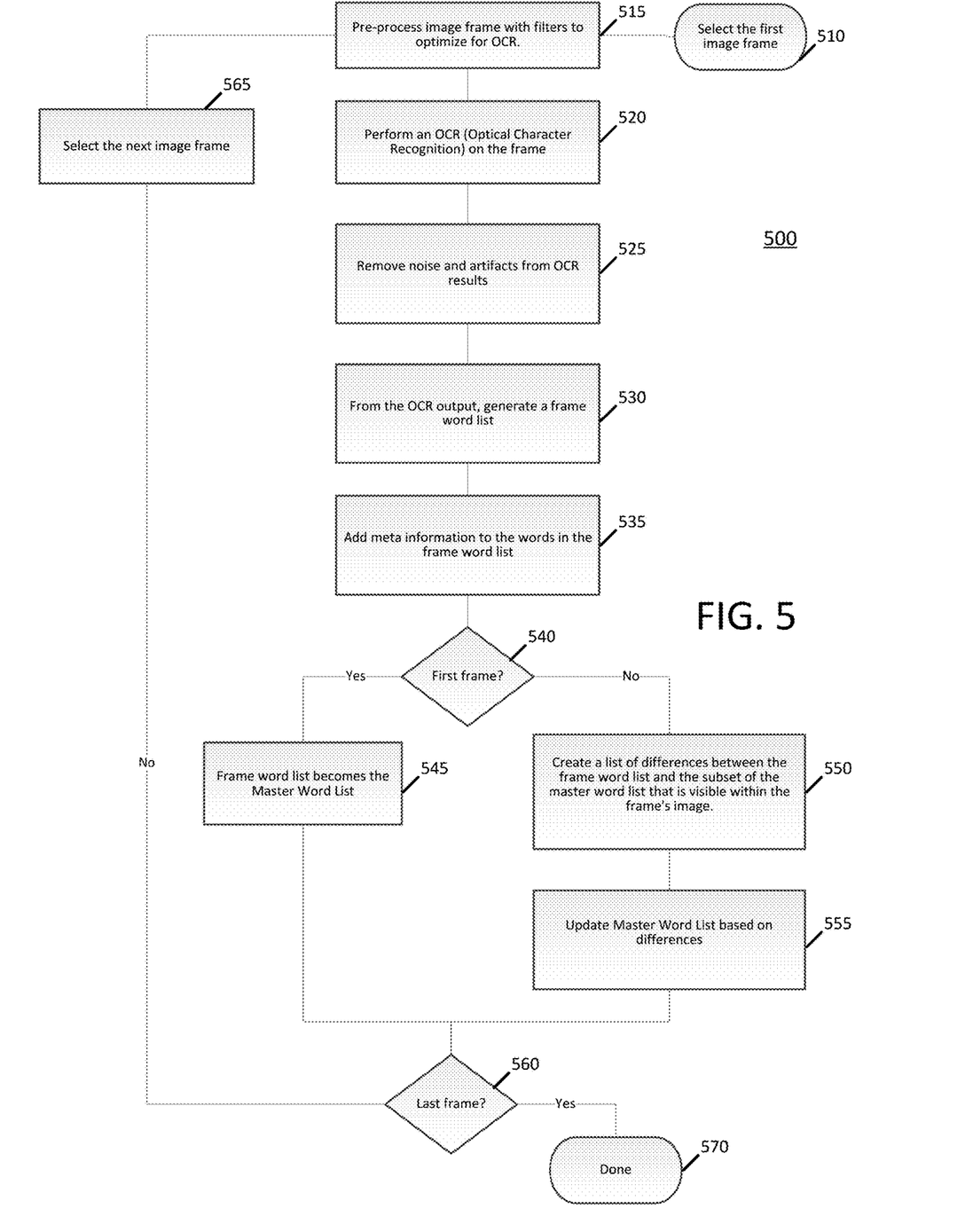
FIG. 5 is a flow chart illustrating a detailed process of identifying words of captioned text in a captioned video according to an example embodiment.

FIG. 5 is a flow chart showing a detailed process 500 of identifying words of captioned text in a captioned video according to an example embodiment. The process 500 may be implemented by a processor in a device. In other embodiments, the process 500 may be performed by other entities. In other embodiments, the process 500 includes more, fewer, or different steps than shown in FIG. 5.

In an operation 510, a processor having programmed instructions selects a first image frame. The image frame includes caption words in the image. In an operation 515, the processor pre-processes the image frame using filters that help optimize the image frame for optical character recognition (OCR). Then, in an operation 520, an OCR algorithm is applied to the image frame to identify and recognize words from the image frame. In an operation 525, noise and artifacts are removed from the OCR results. For example, the processor can remove all line breaks and extraneous spacing, so the frame is seen as a single string of words. The processor can filter each word is against a language diction- ary to ensure that artifacts (such as a line cut in half) do not enter the final result. In an operation 530, the processor uses the OCR output to generate a frame word list. The processor adds meta information to the words in the frame word list in an operation 535.

The processor does a check to see if the current frame is the first frame analyzed (operation 540). If the current frame is the first frame, the frame word list becomes the master word list (operation 545). If the current frame is not the first frame, the processor creates a list of differences between the frame word list and the subset of the mast word list that is visible within the frame's image (operation 550). In at least one embodiment, the processor creates the list of differences by performing a diff operation comparing the current-frame string against the previous frame producing a difference description, describing words that are the same as the last frame, words that were removed from the last frame, and words that were inserted into the last frame to get the current-frame string. In an operation 555, the processor updates the master word list based on differences.

After operations 545 and 555, the processor does a check to see if the current frame is the last frame to be analyzed (operation 560). If the current frame is not the last frame, the processor selects the next frame image (operation 565) and control returns to operation 515. If the current frame is the last frame, the process ends in an operation 570.

When each frame has been processed, the system now has a completed word list that encapsulates each caption and how it changed over the course of the session, along with the video timing data.

The example embodiments described herein provide an advantageous technical approach whereby video may be processed by a computing environment in a way that creates a descriptive textual file as output that includes information about the captions, including what captions were displayed, when they were displayed on the screen as well as when they were displayed relative to the corresponding spoken words within the audio feed. This textual file can then serve as input to either human-based or computer-based systems that gather measurements for quality assessment. The use of the embodiments has technical advantages that eliminate human bias and errors, and potentially reduce the labor and time involved in the assessment process. In a separate use case, the descriptive textual file may optimally realign the timing of captions with spoken audio for future broadcasts of the original video/audio content.

The preceding description is directed to certain implementations for the purposes of describing the innovative aspects of this disclosure. However, a person having ordinary skill in the art will readily recognize that the teachings herein can be applied in a multitude of different ways. The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, directional terms are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A non-transitory computer readable medium comprising instructions when executed by a processor cause the processor to:
   receive audio and video content from a caption device, wherein the video content includes captioned text;
   extract frames of video from the received video content, wherein the frames of video include captioned text;
   recognize text from the captioned text in the extracted frames of video, wherein the recognized text is included in a text transcription;
   compare a current frame string of text in the text transcription against a previous frame string of text to produce a difference text description; and
   generate a descriptive textual file including text timing information for the recognized text in the extracted frames and audio timing information by determining a time at which the text in the text transcript are spoken in the received audio.

2. The non-transitory computer readable medium of claim 1, further comprising instructions when executed by the processor cause the processor to stitch extracted frames together to form a captioned video file.

3. The non-transitory computer readable medium of claim 2, further comprising instructions when executed by the processor cause the processor to apply a diffing operation to the extracted frames of video.

4. The non-transitory computer readable medium of claim 2, further comprising instructions when executed by the processor cause the processor to apply a backtrack operation to the extracted frames of video.

5. The non-transitory computer readable medium of claim 1, further comprising instructions when executed by the processor cause the processor to:
generate a list of text and metadata from the received audio and video content in an extracted frame; and
remove line breaks and spaces in the extracted frame.

6. The non-transitory computer readable medium of claim 1, wherein the determined time is added to a metadata file.

7. The non-transitory computer readable medium of claim 6, further comprising instructions when executed by the processor cause the processor to analyze a delay between a text being spoken and when a corresponding word caption is displayed.

8. The non-transitory computer readable medium of claim 6, further comprising instructions when executed by the processor cause the processor to determine if a text in a text caption is spoken.

9. The non-transitory computer readable medium of claim 1, further comprising instructions when executed by the processor cause the processor to realign the timing of captions with spoken audio to generate an optimal format file.

10. The non-transitory computer readable medium of claim 1, wherein the descriptive textual file includes original video data, each text displayed, time each text displayed, time text spoken, and a history of changes in captioning over time due to corrections.

11. A method comprising:
receiving audio and video content from a caption device, wherein the video content includes captioned text;
extracting frames of video from the received video content, wherein the frames of video include captioned text;
recognizing text from the captioned text in the extracted frames of video, wherein the recognized text is included in a text transcription;
comparing a current frame string of text in the text transcription against a previous frame string of text to produce a difference text description; and
generating a descriptive textual file including text timing information for the recognized text in the extracted frames and audio timing information by determining a time at which text in the text transcript are spoken in the received audio.

12. The method of claim 11, further comprising combining extracted frames together to form a captioned video file.

13. The method of claim 11, wherein the determined time is added to a metadata file.

14. The method of claim 11, further comprising analyzing a delay between a text being spoken and when a corresponding text caption is displayed.

15. The method of claim 11, further comprising determining accuracy of captions.

16. A system comprising:
a processor; and
a non-transitory computer readable medium comprising instructions when executed by the processor cause the processor to:
receive audio and video content from a caption device, wherein the audio and video content includes captioned text;
extract frames of video from the received audio and video content, wherein the frames of video include captioned text;
recognize text from the captioned text in the extracted frames of video, wherein the recognized text is included in a text transcription;
compare a current frame string of text in the text transcription against a previous frame string of text to produce a difference text description; and
generate a descriptive textual file including text timing information for the recognized text in the extracted frames and audio timing information by determining a time at which the text in the text transcript are spoken in the received audio.

17. The system of claim 16, further comprising instructions when executed by the processor cause the processor to stitch extracted frames together to form a captioned video file.

18. The system of claim 16, further comprising instructions when executed by the processor cause the processor to apply a diffing operation to the extracted frames of video.

19. The system of claim 16, further comprising instructions when executed by the processor cause the processor to apply a backtrack operation to the extracted frames of video.

20. The system of claim 16, further comprising instructions when executed by the processor cause the processor to:
generate a list of text and metadata from the received audio and video content in an extracted frame; and
remove line breaks and spaces in the extracted frame.

* * * * *